March 25, 1941. R. E. KELLEY Re. 21,755

PORTABLE APPARATUS FOR SUPPLYING HEAVY MASTICS TO MASTIC APPLYING GUNS

Original Filed April 2, 1937 2 Sheets-Sheet 1

INVENTOR
Raymond E. Kelley
BY
Pogue and Pogue
ATTORNEYS

March 25, 1941. R. E. KELLEY Re. 21,755
PORTABLE APPARATUS FOR SUPPLYING HEAVY MASTICS TO MASTIC APPLYING GUNS
Original Filed April 2, 1937 2 Sheets-Sheet 2
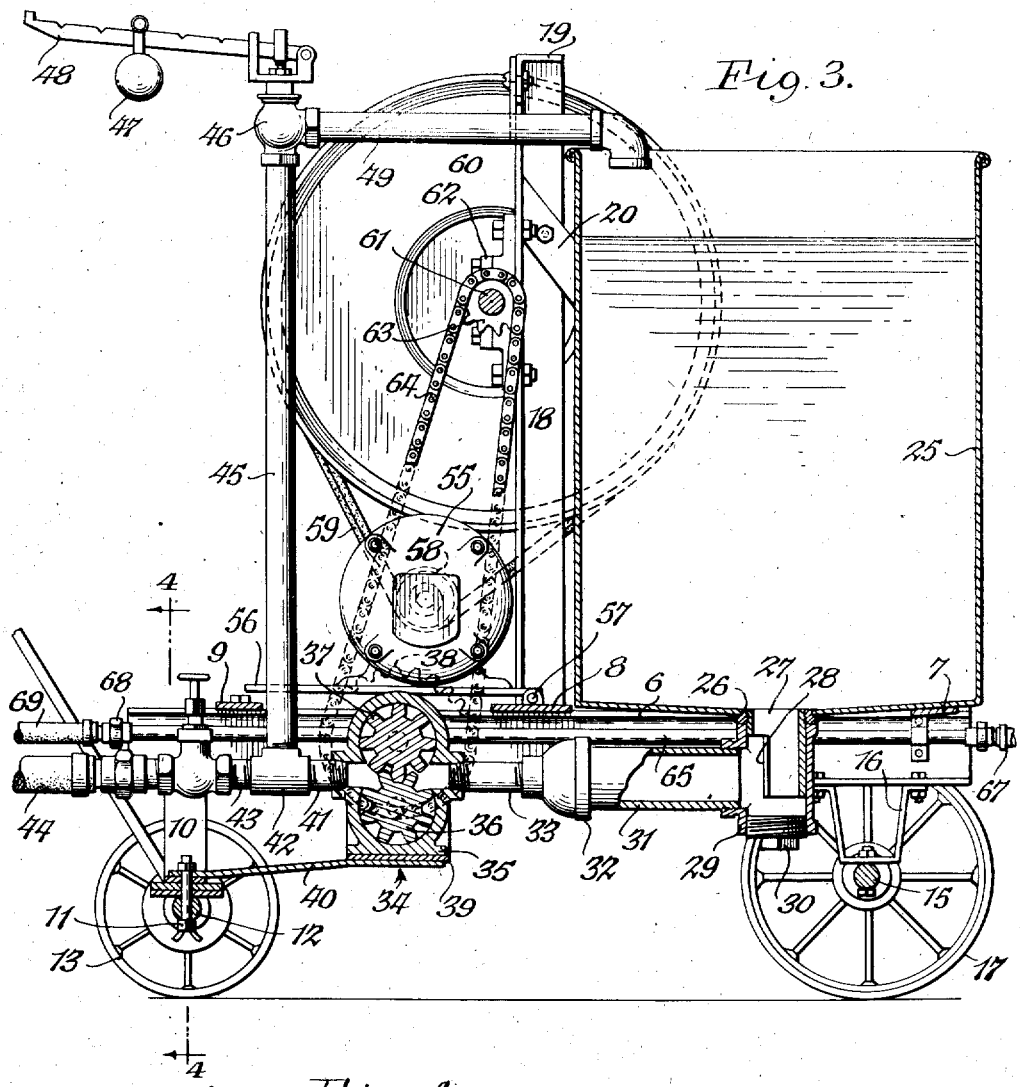
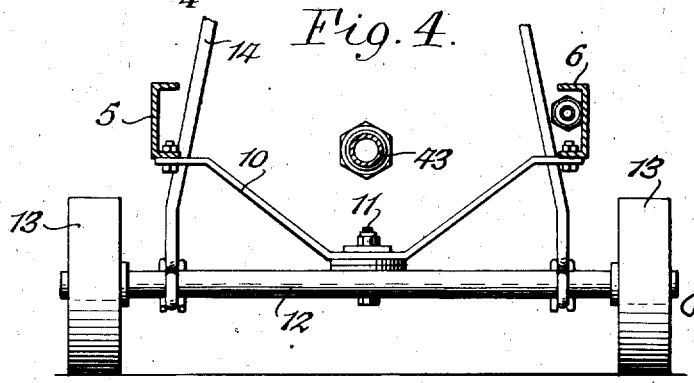
INVENTOR
Raymond E. Kelley
BY
Pope and Pope
ATTORNEY Reissued Mar. 25, 1941

Re. 21,755

UNITED STATES PATENT OFFICE 21,755

PORTABLE APPARATUS FOR SUPPLYING HEAVY MASTICS TO MASTIC APPLYING GUNS

Raymond E. Kelley, Snyder, N. Y.

Original No. 2,160,871, dated June 6, 1939, Serial No. 134,672, April 2, 1937. Application for reissue January 26, 1940, Serial No. 315,841

11 Claims. (Cl. 221—80)

This invention relates to a portable apparatus which holds a quantity of heavy asphalt fibered mastic, such as is used in damp-proofing and waterproofing building walls and the like and supplying such mastic under pressure to a mastic applying gun such as the pressure gun for the application of heavy asphalt fibered mastic disclosed in my Patent No. 1,989,696, dated February 5, 1935. Prior to the commercial use of the present invention in combination with my said pressure gun, attempts had been made to apply heavy asphalt fibered mastic by means other than troweling, but such efforts did not meet with success due to the fact that the material being handled was so extremely viscous that it was impossible to secure a uniform flow of the mastic to the gun and also uniform application by the gun itself was impossible.

With the pressure gun shown in my said patent heavy fibered mastics were successfully applied to wall surfaces as a uniform spray so as to provide a uniform coating and thickness, and the present invention is directed to an apparatus for supplying heavy asphalt fibered mastic to the gun for application on the building walls or the like.

The principal object of the present invention is to provide a portable apparatus for containing and delivering a uniform stream of heavy asphalt fibered mastic to a pressure gun and which is so constructed that it will not, under normal circumstances, become clogged and should any stoppage occur can be quickly cleared of the obstruction.

Another object of the present invention is to provide such apparatus which is compact and comparatively light in weight so that it can be readily moved from place to place by hand, thereby facilitating the movement of the work in damp-proofing and waterproofing the masonry walls of a building either below or above grade.

Another aim of the present invention is to provide a pump mechanism which is continuously actuated and supplies the fibered mastic to the gun under constant pressure, by-pass means being provided from the outlet of the pump to the fibered mastic container when the outlet pressure is in excess of that required for the proper application of the mastic by the gun.

Another object of the present invention is to provide such an apparatus which includes such a container for the fibered mastic which is readily removable so that the application of different material can be effected without delay and also so that the pump and its piping are quickly rendered accessible should any stoppage occur.

Another important object of the present invention is to so arrange the pump and piping connections as to provide a straight line delivery of the heavy fibered mastic from the container outlet to the flexible conduits which deliver the mastic to the gun and at the same time provide a compact and simple arrangement, particularly for applying power to the pump.

Another object of the present invention is to render all parts readily accessible for adjustment or repairs without impairing the compactness of the device as a whole.

In the accompanying drawings:

Fig. 3 is a vertical longitudinal section, taken on line 3—3, Fig. 2.

Fig. 4 is a fragmentary, vertical, transverse section, taken on line 4—4, Fig. 3.

Figure 1:
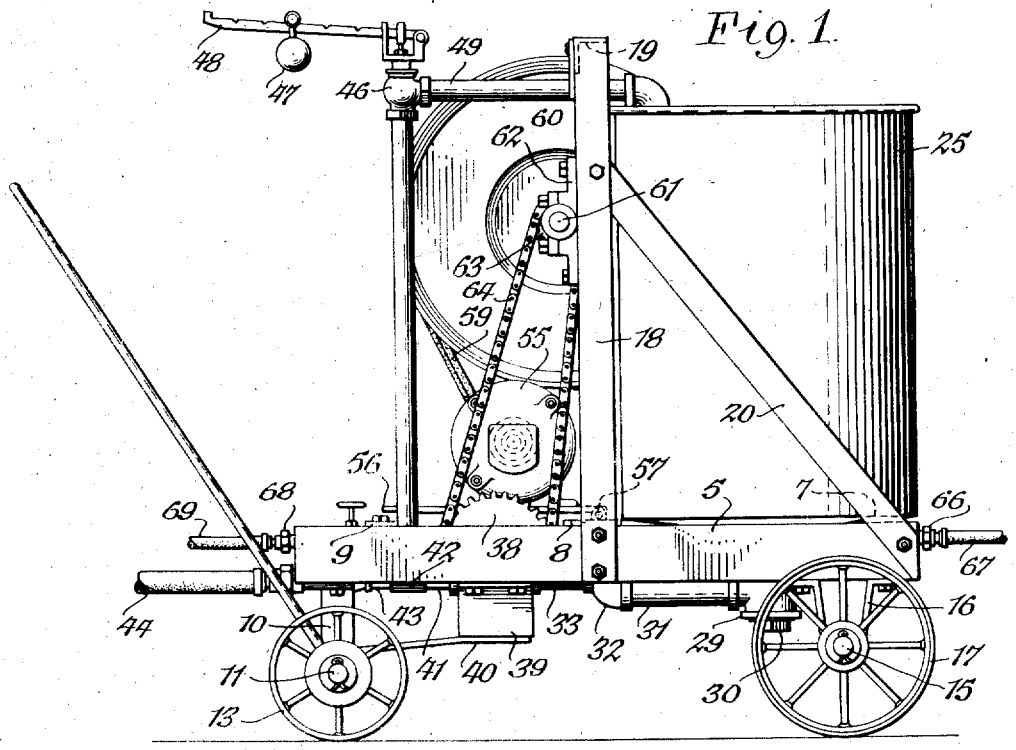
Fig. 1 is a side elevation of the portable apparatus for supplying heavy mastic to a pressure gun made in accordance with my invention.

In its general organization this invention comprises a hand truck carrying at one end a removable fibered mastic drum, the outlet of which fits into the end of a straight horizontal pipe leading to an underslung gear pump carried at the other end of the truck, the delivery from the pump consisting of a pipe which is in axial alignment with the horizontal inlet pipe and connects with a flexible hose leading to the pressure gun. A by-pass line is provided from the outlet of the pump to the barrel for delivering a part of the mastic back to the barrel when the outlet pressure exceeds that at which it is desirable to operate in gun applying the mastic. The motor for operating the pump is preferably located immediately above the pump and operates through an overhead drive which also provides the necessary reduction between the motor and the pump.

The truck which carries the apparatus forming the subject of my invention is shown as comprising two side channel bars 5 and 6 which are connected by a cross bar 7 at the rear end of the truck, a central cross bar 8 and a front cross bar 9, all of which can be bolted together or secured in any suitable manner. The side channels 6 are also connected at their front ends by a bolster 10 which is depressed at its center, as best illustrated in Fig. 4, and is centrally connected by a kingbolt 11 with the front axle 12 of the truck. Front steering wheels 13 are mounted at the ends of the front axle 12 in any suitable manner and the axle 12 is turned and the truck propelled by a U-shaped bar or handle 14 which is connected to the axle 12 at its opposite ends so as to be capable of vertical swinging movement. The handle 14 may be retained in a vertical position by engaging notches provided in the lower flanges of the channels 5 and 6. The rear axle 15 is bolted to U-shaped supports 16 which project downwardly from the rear ends of the side channels 5 and 6 and the rear wheels 17 are mounted in any suitable manner on the ends of the rear axle 15. Centrally of the truck, side posts 18, preferably in the form of angle bars, project upwardly and these side posts are connected at their upper ends by a cross angle bar 19 and are also braced by diagonal bars 20 which extend downwardly from a point near the top of the posts 18 to the rear ends of the side channels 5 and 6.

Figure 2:
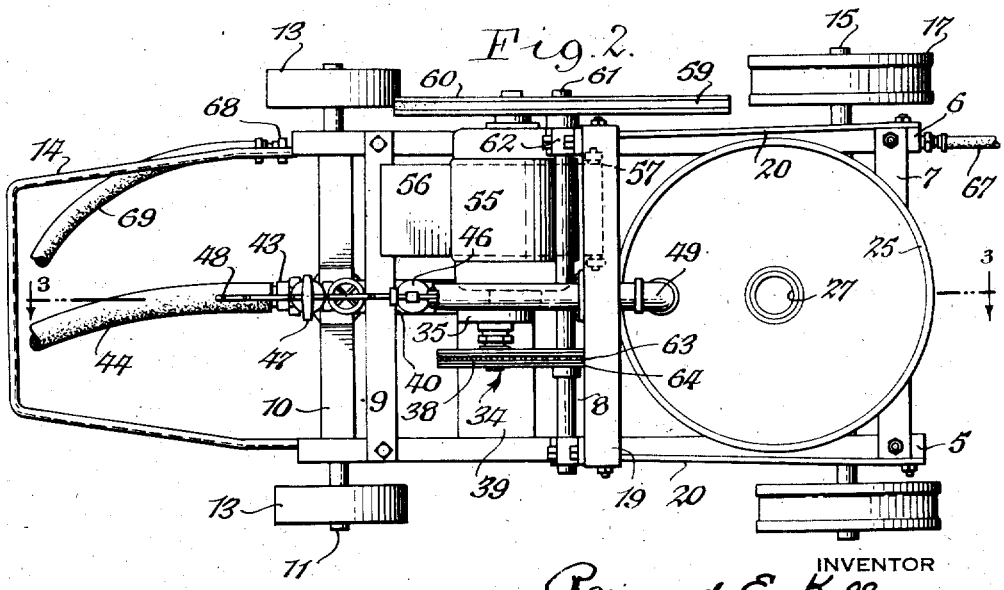
Fig. 2 is a top plan view thereof.

The heavy asphalt mastic which the apparatus is designed to handle is poured into an open drum or barrel 25 the lower head of which is dished downwardly and is provided with a central discharge opening. The lower head of the drum 25 rests on the upper flanges of the side channels 5 and 6 of the truck and also on the cross bar 7, as best illustrated in Figs. 2 and 3. In the central discharge opening of the drum 25 is welded an internally threaded ring 26 in which a depending pipe 27 is screwed. This pipe is cut away at one side as illustrated at 28 and fits into the open upper end of a T 29, the ring 26 bearing against the round upper face of the T and the stem or pipe 27 snugly fitting in the T 29 so as to prevent the leakage of mastic and at the same time permit the drum 25 and the attached discharge pipe 27 to be readily lifted from the truck and T 29. The lower branch of the T 29 is closed by a plug 30 and the horizontal branch of the T 29 connects with a horizontal discharge pipe 31. The T 29, discharge pipe 31 and stem or pipe 27 in the bottom of the drum are all of large dimensions so that there is no danger of the heavy mastic clogging these parts. The outlet of the pipe 31 is connected with a reducer 32 to the inlet pipe 33 of a gear pump 34. It will also be understood that a single or double acting piston pump could be employed. The gear pump can be of any usual form and is shown as consisting of a casing 35 containing a lower gear 36 meshing with an upper driving gear 37 which is driven by an external sprocket 38. The gear pump 34 is underslung and the meshing teeth of the gears are axially in line with the inlet pipes 33 and 31. The mounting for the gear pump casing 35 consists of an underslung cross strap 39 which is secured at its ends to the side channels 5 and 6 and is strengthened by a longitudinal brace 40 which extends forwardly and is connected to the kingbolt 11, as best shown in Fig. 3. The rotation of the gears delivers the mastic to an outlet pipe 41 connected by a T 42 with a valved pipe 43 to which the flexible tube 44 which conducts the mastic to the pressure gun (not shown) is connected. The outlet pipes 41 and 43 are axially in line with the inlet pipes 31 and 33 so that the mastic is drawn in a straight line through these pipes and through the pump and discharged into the flexible hose 44. By this means there is little danger of this portion of the apparatus becoming clogged.

For uniform gun application it is desirable to supply the heavy mastic at a uniform pressure and to secure this uniform pressure in a simple and effective manner a by-pass pipe 45 connects with the T 42 and extends upwardly to a pressure release valve 46. The pressure release valve 46 can be of any usual form and is shown as being of the type in which the pressure at which it will release is determined by the setting of a weight 47 along a lever arm 48. When the outlet pressure of the gear pump 34 exceeds the setting of the valve 46 mastic is delivered from the vertical pipe 45 to a horizontal discharge pipe 49 which conducts the mastic back to the drum 25.

Power for driving the pump 34 is supplied by an electric motor 55 which is carried on a vertically swinging platform or base 56, the rear end of which is pivoted to the cross bar 8 as indicated at 57. The motor pulley 58 drives a V-belt 59 which in turn drives a large wheel 60 fast to a shaft 61. By mounting the motor 55 on the vertically swinging platform or base 56 it will be seen that the weight of the motor acts as a tightener for the belt 59. The opposite ends of the cross shaft 61 are journaled in bearings 62, each of which is mounted near the upper end of a corresponding side post 18. Between the bearing 62 a small sprocket 63 is fast to the shaft 61 and this sprocket is connected by a chain 64 with the sprocket 38 driving the gear pump. It will be seen that by this arrangement the motor is located immediately above the pump and drives the pump through an overhead drive which also acts to reduce the speed of rotation of the motor to that required for proper operation of the gear pump 34.

It is desirable to have the air line and the mastic line to the gun arranged close to one another and therefore the truck also carries a compressed air pipe 65 which is secured in any suitable manner along the inside of the channel 6 and at its rear end is provided with a coupling 66 for connection with a compressed air line 67 leading to the compressor and at its front end carries a coupling 68 for connection with the flexible compressed air hose 69 leading to the pressure gun.

With the portable apparatus as above described I have found that asphaltic mastics of extremely heavy viscosity, and also fibered mastics are delivered to a pressure gun, such as is shown in my aforesaid Patent No. 1,989,696, at a constant pressure and in a uniform stream so that such mastics can be easily and uniformly applied to surfaces such as masonry walls. Furthermore, by maintaining a straight line flow from the discharge of the drum to the flexible hose there is little danger of clogging. If an obstruction should occur a rag wrapped around the end of a stick can be easily inserted into the outlet pipe 27 of the drum 25 and the drum 25 lifted from the truck so as to expose the open T 29 and permit of ready removal of the obstruction. Further, it will be seen that the valve 46 controlling the by-pass pipes 45 and 49 insure that the mastic is supplied to the gun at a uniform pressure, thereby insuring the most efficient operation of the gun. It will also be seen that by providing the underslung gear pump 34 the mastic is drawn directly from the bottom outlet of the removable drum 25 and delivered in a straight line to the flexible hose leading to the pressure gun. It will therefore be apparent that the present invention provides a very compact and efficient portable apparatus for delivering heavy mastics and fibered mastics to a pressure gun and which will insure a constant supply at uniform pressure under all conditions of operation.

I claim as my invention:

1. Portable apparatus for supplying a stream of heavy asphalt mastic under pressure, comprising a portable frame, a mastic supply tank resting on said frame and having an outlet at its bottom, an underslung pump carried by said frame and having its inlet and outlet extending horizontally in axial alinement with one another and both arranged below the outlet of said tank, a motor mounted on said frame and driving said pump, a pipe arranged under the outlet of said tank and connecting with the inlet of said pump, a discharge pipe attached to the outlet of said pump, and a tail pipe secured to said tank and surrounding said tank outlet, said tail pipe slidingly fitting in the adjacent end of said first pipe.

2. Portable apparatus for supplying a stream of heavy asphalt mastic under pressure, comprising a portable carriage, an open mastic supply tank removably mounted on said carriage and having an outlet at the lower portion of said tank, a pump mounted on said carriage adjacent the lower end of said tank, a motor mounted on said carriage and driving said pump, a pipe connecting said outlet with the inlet of said pump, a discharge pipe attached to the outlet of said pump, a by-pass pipe connected with the pump discharge and extending upwardly and then laterally to discharge over the upper rim of said tank and into said tank, a valve in the upper part of said by-pass pipe and permitting the flow of mastic therethrough when the pump discharge pressure exceeds the setting of said valve and means for regulating said valve.

3. Portable apparatus for supplying a stream of heavy asphalt mastic under pressure, comprising a portable carriage, a mastic supply tank removably resting on one end of said carriage and having an opening in its bottom, a stem secured to the bottom of said tank around said opening, a pump mounted on the other end of said carriage and having its inlet and outlet axially in line with said stem, an elbow around said stem and fitted against the bottom of said tank, said stem being slidably fitted in said elbow to permit said supply tank to be lifted from said carriage, a pipe connecting said elbow and said pump inlet, a discharge pipe connecting with said pump outlet, said pipes being in substantial axial alinement and a motor mounted on said carriage and driving said pump.

4. Portable apparatus for supplying a stream of heavy asphalt mastic under pressure, comprising a portable carriage, a mastic supply tank removably resting on one end of said carriage and having an opening in the lower portion of said tank, a pump mounted on the other end of said carriage adjacent the lower end of said tank, a pipe connecting said opening with the inlet of said pump, a discharge pipe attached to the outlet of said pump, a motor mounted above said pump and alongside said tank and an overhead drive between said motor and pump and arranged alongside said tank and extending over said motor.

5. Portable apparatus for supplying a stream of heavy asphalt mastic under pressure, comprising a portable carriage, a pair of side posts rising therefrom and arranged substantially midway between the ends of said carriage, a mastic supply tank removably resting on one end of said carriage and having an opening in its bottom, a pump mounted on the other end of said carriage adjacent the lower end of said tank, a pipe connecting said opening with the inlet of said pump, a discharge pipe attached to the outlet of said pump, a transverse shaft journalled on said posts, a drive connecting one end of said shaft with said pump, a pulley at the other end of said shaft, a motor mounted on said carriage above said pump and a belt drive between said motor and pulley.

6. Portable apparatus for supplying a continuous stream of heavy asphalt mastic under pressure, comprising a portable carriage having spaced side bars connected by spaced cross bars, a cylindrical mastic supply tank arranged vertically on said carriage and having its rim portions loosely resting on said side and cross bars, a tail pipe extending downwardly from the center of said tank and forming a discharge spout, a pump mounted on said carriage adjacent the lower end of said tank, a motor mounted on said carriage and driving said pump, a pipe having an upright part slidably receiving said tail pipe and having its other end connected to the inlet of said pump and a discharge pipe attached to the outlet of said pump.

7. Portable apparatus for supplying a stream of heavy asphalt mastic under pressure, comprising a portable carriage, a mastic supply tank removably resting on one end of said carriage and having an opening in the lower portion of said tank, a pump mounted on the other end of said carriage adjacent the lower end of said tank, a pipe connecting said opening with the inlet of said pump, a discharge pipe attached to the outlet of said pump, a motor mounted alondside said tank, and an overhead drive between said motor and pump and arranged alongside said tank and extending over said motor.

8. Portable apparatus for supplying a continuous stream of heavy asphalt mastic under pressure, comprising a portable carriage, a mastic supply tank mounted on said carriage and having a continuously unobstructed outlet in its lower portion, a continuous uniform delivery pump mounted on the carriage adjacent the lower end of said tank, a single horizontal pipe having a quick detachable connection with said outlet and connecting said outlet with the inlet of said pump and providing constant unobstructed communication between the mastic in said tank and said pump, a discharge pipe connected to the outlet of said pump, a by-pass pipe connected to the pressure side of said pump and returning the material to the inlet side thereof and a valve in said by-pass pipe and permitting the flow of mastic therethrough when the pump discharge pressure exceeds the setting of the valve.

9. Portable apparatus for supplying a stream of heavy asphalt mastic under pressure, comprising a portable carriage, an open mastic supply tank mounted on said carriage and having an outlet at the lower portion of said tank, a pump mounted on said carriage adjacent the lower end of said tank, a motor mounted on said carriage and driving said pump, a pipe connecting said outlet with the inlet of said pump, a discharge pipe attached to the outlet of said pump, a by-pass pipe connected with the pump discharge and extending upwardly and then laterally to discharge over the upper rim of said tank and into said tank, a valve in the upper part of said by-pass pipe and permitting the flow of mastic therethrough when the pump discharge pressure exceeds the setting of said valve and means for regulating said valve.

10. Portable apparatus for supplying a stream of heavy asphalt mastic under pressure, comprising a portable carriage, a mastic supply tank mounted on said carriage and having an outlet at the lower portion of said tank, a continuous uniform delivery pump mounted on said carriage adjacent the lower end of said tank, a motor mounted on said carriage and driving said pump, a pipe connecting said outlet with the inlet of said pump, a discharge pipe attached to the outlet of said pump and a pressure relief by-pass valve connected with said pump discharge and leading to said tank at a point above the level of mastic in said tank.

11. Portable apparatus for supplying a stream of heavy asphalt mastic under pressure, comprising a portable carriage, a mastic supply tank mounted on said carriage and having an outlet at the lower portion of said tank, a continuous uniform delivery pump mounted on said carriage adjacent the lower end of said tank, a motor mounted on said carriage and driving said pump, a pipe connecting said outlet with the inlet of said pump, a discharge pipe attached to the outlet of said pump, a by-pass pipe connected with said pump discharge and communicating with the extreme upper portion of said tank to discharge into said tank above the level of mastic in said tank, a valve in the upper part of said by-pass pipe and permitting the flow of mastic therethrough when the pump discharge pressure exceeds the setting of said valve and counterweight means for regulating said valve.

RAYMOND E. KELLEY.